United States Patent
Gerber

(10) Patent No.: US 7,893,822 B2
(45) Date of Patent: Feb. 22, 2011

(54) HYBRID DRIVE MODE INDICATOR

(76) Inventor: Allen Gerber, 42 Nutmeg Rd., High Falls, NY (US) 12561

( * ) Notice: Subject to any disclaimer, the term of this patent is extended or adjusted under 35 U.S.C. 154(b) by 712 days.

(21) Appl. No.: 11/891,261

(22) Filed: Aug. 9, 2007

(65) Prior Publication Data

US 2009/0040032 A1   Feb. 12, 2009

(51) Int. Cl.
*B60Q 1/00* (2006.01)
(52) U.S. Cl. .............. 340/463; 340/461; 340/469; 340/438; 340/441; 180/65.235; 180/65.265; 701/22; 701/25; 701/26; 701/201; 701/202
(58) Field of Classification Search ........ 340/463, 340/461, 469, 438, 441; 180/65.235, 65.265, 180/65.2, 65.3; 701/22, 25, 26, 201, 202
See application file for complete search history.

(56) References Cited

U.S. PATENT DOCUMENTS

| | | | | |
|---|---|---|---|---|
| 5,623,194 A | * | 4/1997 | Boll et al. | 320/137 |
| 6,814,170 B2 | * | 11/2004 | Abe et al. | 180/65.25 |
| 7,273,120 B2 | * | 9/2007 | Tabata | 180/65.265 |
| 7,562,731 B2 | * | 7/2009 | Usami et al. | 180/65.275 |
| 7,639,019 B2 | * | 12/2009 | Bosse et al. | 324/426 |
| 2005/0128065 A1 | * | 6/2005 | Kolpasky et al. | 340/461 |

FOREIGN PATENT DOCUMENTS

JP     2003-260990    * 9/2003

* cited by examiner

*Primary Examiner*—Tai T Nguyen
(74) *Attorney, Agent, or Firm*—Lawrence D. Cutter, Esq.

(57) ABSTRACT

A motorized vehicle that is capable of operating in a mode in which motive power is being supplied wholly or partially from electric power is provided with an exterior indicator showing this mode of operation to other vehicle operators. In this way other drivers are alerted to the fact that the vehicle is under electric power and is not likely to be accelerated, particularly uphill.

4 Claims, 4 Drawing Sheets

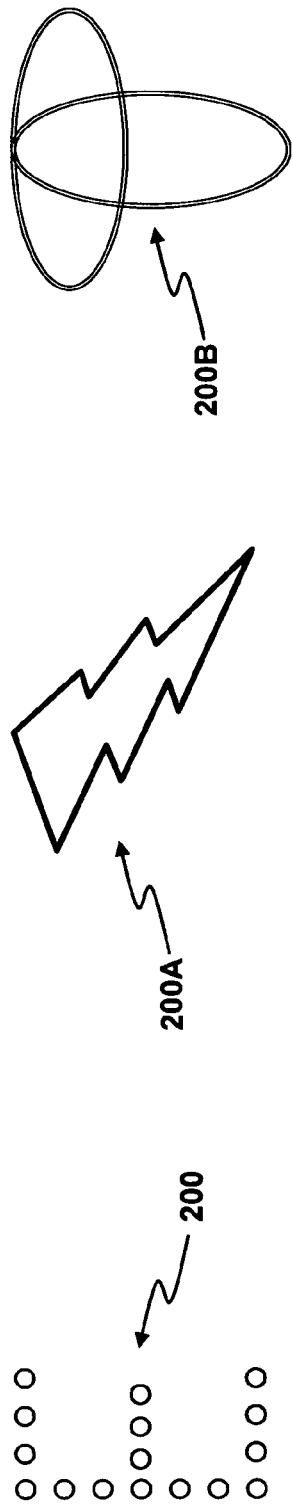
Fig. 3
Fig. 4
Fig. 5
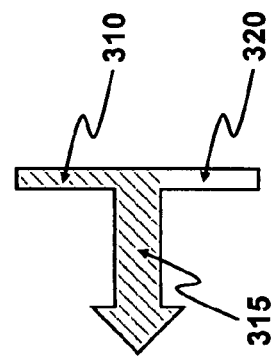
Fig. 7
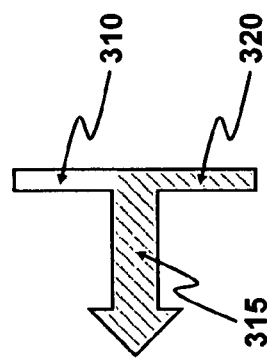
Fig. 6

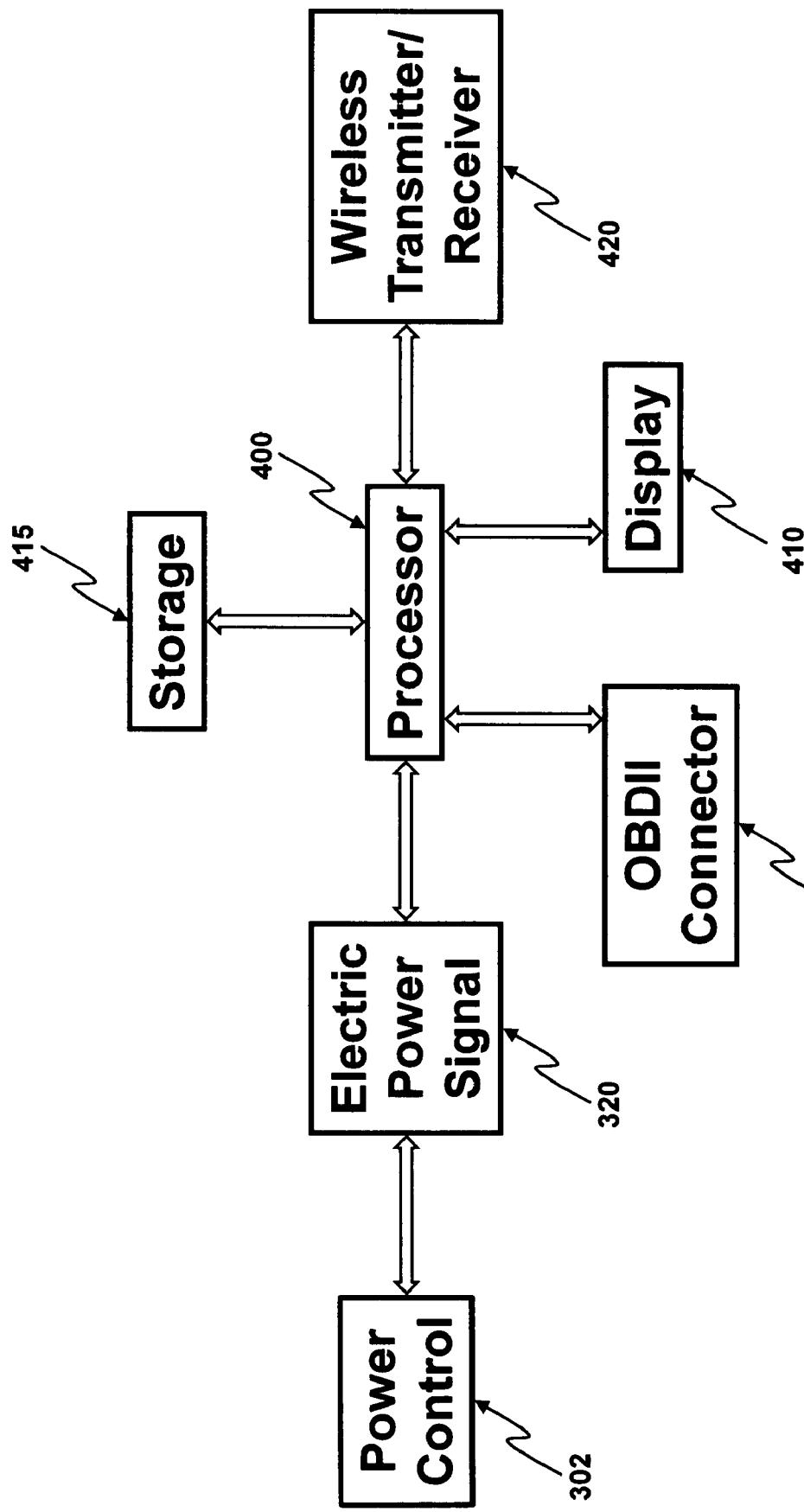

US 7,893,822 B2

HYBRID DRIVE MODE INDICATOR

TECHNICAL FIELD

This invention relates in general to automobiles and similar vehicles, and more particularly, to such vehicles that are powered for at least some period of time by electrical energy. Even more particularly, the present invention is directed to an external indicator for such a vehicle that provides a signal to other drivers that the vehicle is being operated on electric power.

BACKGROUND OF THE INVENTION

With the drive for alternate fuel vehicles and hybrid vehicles that operate on both fossil fuel power and on electric power, the number of such vehicles in use on the highway has grown significantly and it is anticipated that this growth in their numbers will continue for some time into the future. Thus, drivers in the United States and around the world can expect to encounter many more of these vehicles in their day to day travels.

However, it has been observed by the present inventor that the behavior of other drivers coupled with somewhat different operational characteristics can present safety issues that have not heretofore been present. Many drivers are clearly very much unaccustomed to sharing the road with hybrid or totally electric vehicles. The drivers of hybrid and totally electric vehicles are very likely to have purchased them for their excellent fuel economy (typically as measured in miles per gallon or the equivalent in terms of dollars per mile). As such these drivers are likely to be found driving in modes which tend to minimize fuel use. Such drivers are unlikely to engage in driving habits that include such behaviors as jack rabbit starts, rapid acceleration, passing, rapid uphill velocity or similar behaviors that negatively impact fuel economy.

The present inventor has observed that this behavior on the part of the drivers of hybrid and totally electric vehicles, is not always fully understood or appreciated by the drivers of conventional vehicles. The drivers of conventional vehicles tend to tailgate the "unconventional" vehicles leading to dangerous and risky situations. For example, when going uphill, the drivers of hybrid and totally electric vehicles tend to go slowly and are not likely to attempt to speed up even when "urged" to do so by the tailgating behavior of the driver of a conventional vehicle. Such situations present a safety hazard which is ameliorated by providing an indication to the tailgating driver that the vehicle is being operated in electric mode. It thus becomes communicated to the other driver that the vehicle in front is not apt to be going any faster. The present invention provides this signal.

Furthermore, it is well known that electric and hybrid vehicles have a positive impact on the environment in that they produce fewer atmospheric pollutants, including fewer green houses gasses such as carbon dioxide ($CO_2$). Manufacturers of such vehicles thus enjoy a public relations and good will advantage in the manufacture and sale of such vehicles. Additionally, having an exterior indication that the vehicle is being operated on electric power is thus seen to provide bragging rights to the users, distributors, importers and manufacturers of such vehicles. As more and more drivers become aware of the growing prevalence of electric and hybrid vehicles, a standard indication, such as the display of an array of blue LED lights in the form of the letter "E" will hopefully grow into being appreciated as a form of status symbol, not in terms of wealth but in terms of being ecologically friendly.

SUMMARY OF THE INVENTION

The shortcomings of the prior art are overcome and additional advantages are provided through a vehicle which is capable of being powered by electrical energy and which includes an external indicia that the vehicle is currently being powered from an electric power source which provides motive power to the wheels of the vehicle.

In another aspect of the present invention information relative to the proportion of time spent in using electrical power is collected, stored and/or transmitted wirelessly as a nationwide indicator of a changeover to electric vehicle operation.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 is a view of a plurality of LED indicators arrayed in the form of the letter E to suggest that E-lectric power is being consumed;

FIG. 4 is a view of one of a plurality of alternate icons that are useful for conveying, once illuminated, the fact that the vehicle is currently being operated wholly or partially on electric power;

FIG. 5 is a view illustrating the fact that the electric mode indicating signal is providable in the form of a manufacturer's illuminated logo;

FIG. 6 is a view of a portion of FIG. 2 illustrating the situation in which power is being supplied to the wheels of the vehicle from an electric power source;

FIG. 7 is a view similar to FIG. 6 except that it illustrates the situation in which power is being supplied to the wheels of the vehicle from a non-electric power source;

FIG. 8 is a systems level view illustrating the collection and dissemination of information relative to the use of electric power for moving the vehicle.

DETAILED DESCRIPTION

Figure 1:
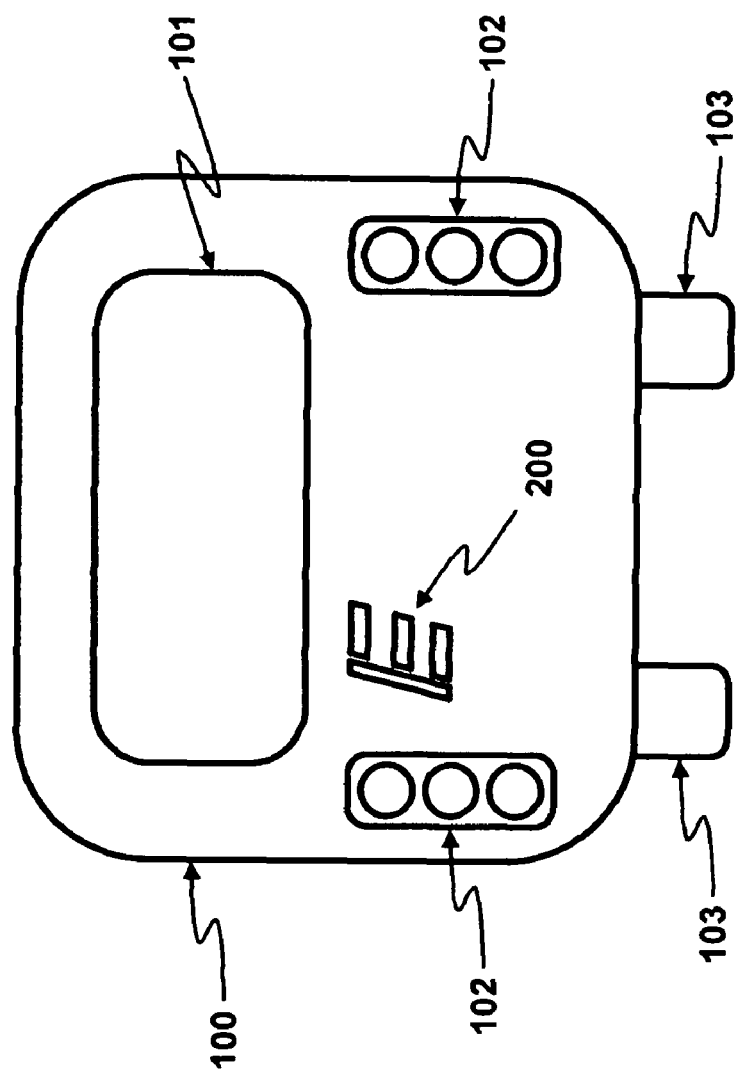
FIG. 1 is a rear view of a vehicle in accordance with the present invention which particularly shows the presence of an externally visible indication that the vehicle is currently being operated at least partially on electric power.

The typical environment in which the present invention is employed is illustrated in FIG. 1. This environment includes vehicle body 100 which also typically includes rear window 101. The rear view shown also includes tires 103 and tail light assemblies 102 which include backup lights, brake lights and nightlights. However, most importantly for the practice of the present invention, the rear view of the vehicle 100 includes an indicia that that the vehicle is being operated wholly or partially on electric power. In the illustration shown this indicia is provided in the form of the letter "E" 200.

It is noted, however, that other indicia reforms may be provided. For example, FIG. 3 illustrates the situation in which the letter "E" is displayed in the form of a plurality of individual lights such as LEDs. If one desires to maintain the theme that the hybrid mode indicator employs blue light, then in FIG. 3 blue LEDs would be used. However, any convenient form of illuminating device may be employed. Such devices may be incandescent or even florescent. Additionally, other colors could be employed as well.

FIG. 4 suggests that hybrid mode indicator 200 may be presented as having the form of a particularly suggestive icon. For example FIG. 4 illustrates the use of lightning bolt 200A. Additionally, as is shown in FIG. 5, it is noted that hybrid mode indicator 200 may also comprise the manufacturer's logo 200B. This variation of the present invention is desirable in those circumstances in which the manufacturer is particularly desirous of promoting or enhancing the trademark. It is noted that the hybrid mode indicator may take the form of any convenient word, shape or symbol while still remaining within the scope of the present invention. Furthermore, while positioning of the hybrid mode indicator on the rear of the vehicle is the preferred location, its positioning elsewhere such as on the front or side of the vehicle is also desirable in some circumstances as a supplemental indication.

Figure 2:
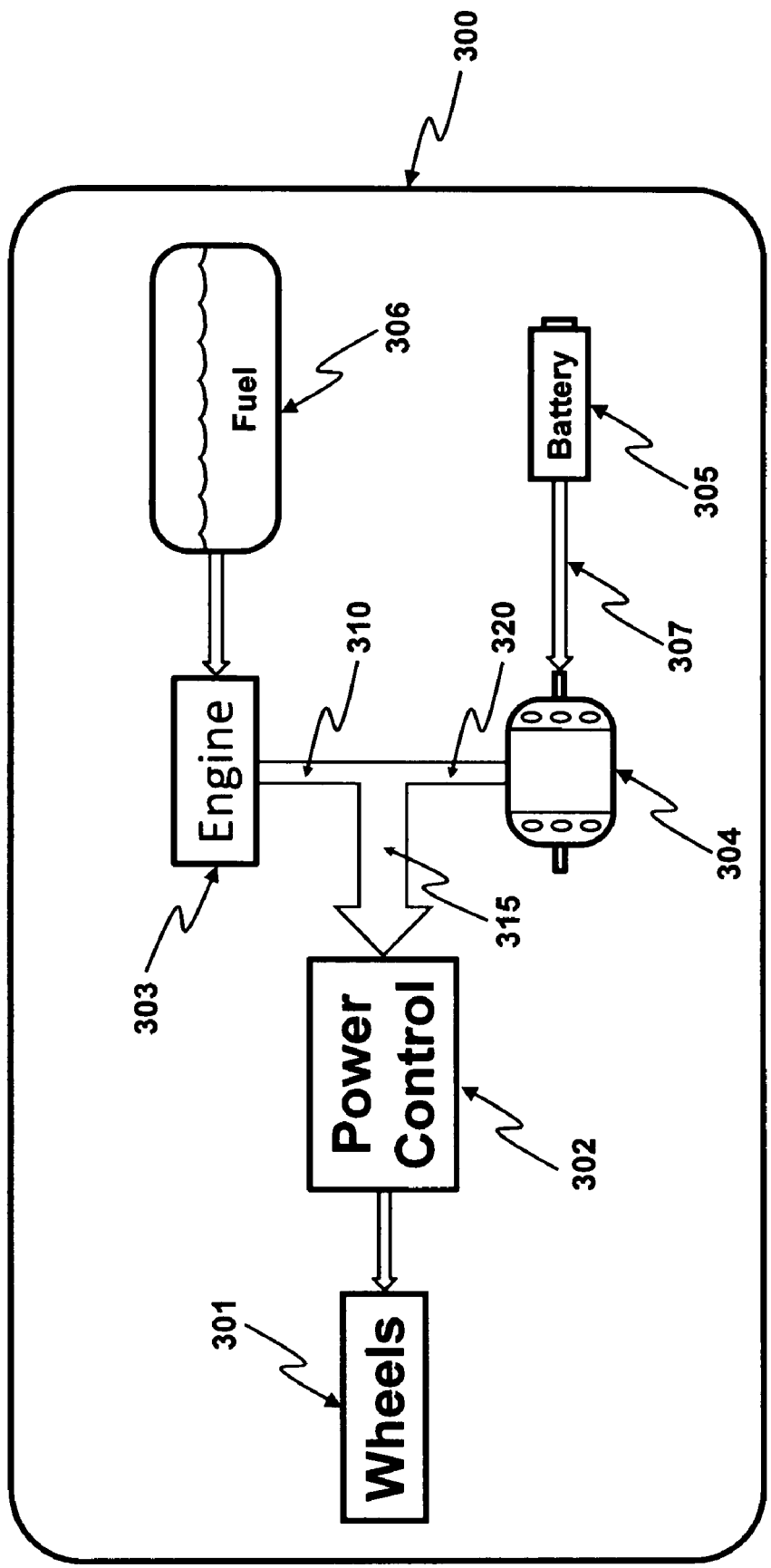
FIG. 2 is a view illustrating a typical screen display that is present in a hybrid vehicle and, from an alternate view, the figure also illustrates the basic components of a hybrid vehicle from a systems level point of view.

FIG. 2 is provided for two purposes. The first purpose is to illustrate the overall system level structure present in a hybrid vehicle. In many hybrid vehicles, particularly high end vehicles, these systems are also shown on a dashboard display in much the same format as is illustrated in FIG. 2. Most relevant to the present invention is the fact that motive power for the vehicle may be provided to wheels 301 either through motor 304 or through engine 303. Typically engine 303 is some form of fossil fuel engine which is supplied with a fuel 306. This fuel comprises gasoline, ethanol, mixtures of gasoline and ethanol, diesel, hydrogen, biodiesel, mixtures of the foregoing and the like.

FIG. 2 also illustrates the presence of motor 304 which is powered by battery 305. Engine at 303 is preferably used to recover braking energy using regenerative braking to recharge battery 305. However battery/battery pack 305, in most present-day hybrids, is recharged through a generator (not shown) given by engine 303. Additionally, battery/battery pack 305 may be recharged through a conventional 110 volt source of electric power.

In typical operation, as long as power control 302 senses that there is sufficient charge present in battery 305, wheels 301 are driven by motor or motors 304 from a battery or battery pack 305. It is also noted that battery pack 305 may be provided in the form of a fuel cell. Thus, reference numeral 305 represents any device for storing sufficient levels of electrical energy. Also seen in FIG. 2 is a flow arrow and having three components, 310, 315 and 320. This flow arrow, being present on display 300, is highlighted in some fashion when power is being supplied from engine 303. However, when power is being supplied from battery 305 flow arrow portions 320 and 315 are highlighted. This state of affairs is further illustrated in FIGS. 6 and 7. FIG. 6 illustrates the situation that exists when power is being supplied fully or partially from battery 305. FIG. 7 illustrates the situation that exists when power is being supplied from engine 303.

While a display 300 provides an internal indication of operation in electric or hybrid mode, hybrid mode indicator 200 is intended to provide an exterior indication that the vehicle is being operated in this state. As indicated above such an indication is useful for the purpose of informing other drivers as to the nature of the vehicle operation and of the unlikely occurrence of sudden acceleration. However, it is noted that information relevant to operation in a mode in which electric power is used is important for other purposes as well. Accordingly, FIG. 8 is provided to illustrate other mechanisms for the gathering of operation in electric mode status information. Clearly power control 302 knows when the vehicle is being powered wholly or partially from battery 305. Accordingly, power control 302 is an appropriate source for electric power signal 320 which is provided to processor 400 which preferably represents one or more of the vehicle's onboard computer systems. Information relating to the time and duration of electric power mode operation is gathered by processor 400 and is placed in onboard storage 415. This information may also be transmitted via a wireless transmitter/receiver 420 to a satellite, to a cell tower or to some other receiving mechanism. The amount of time that the vehicle spends in a hybrid mode operation is also shown on display 410. The information displayed may be selected to be over various periods of time and can even be selected to be gathered and stored as a fraction of vehicle operation hours. These hours may be engine running hours or may be vehicle motion hours. Such information may also be collected, gathered, stored and transmitted, and may even be determined over the life of a vehicle or during the tenure of one of its owners.

Information relating to the amount of time spent in hybrid mode is also stored in a fashion which allows drivers owners mechanics and other interested parties to retrieve this information from standard ODBII connector 405 present on vehicles since 1996. For example, this information may be retrieved at the time of a vehicle's annual inspection. For the more common if transmitted wirelessly this information may be gathered in a central location and used as a publicizable indication of the success and growth of electric vehicle operation. In this regard, it is to be particularly noted that such centrally gathered information is employable as a measure of national pride in reducing the demand for the utilization of fossil fuels all of which unfortunately result in the production of greenhouse gasses. The information gathered is also useful in monitoring compliance with mandated fuel efficiency standards.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A wheeled vehicle comprising:
   an electrical power source for driving said wheels;
   a second power source for driving said wheels;
   an indicia visible from said vehicle's exterior indicating that said wheels are being driven from said electrical power source and
   onboard storage containing information relative to time spent being driven by said electrical power source.

2. The vehicle of claim 1 in which said information is transmittable from said vehicle.

3. The vehicle of claim 1 further including a wireless transmitter for transmitting said information from said vehicle.

4. The vehicle of claim 1 further including a standard connector for retrieving said information from said vehicle.

\* \* \* \* \*